(12) United States Patent
Blasko et al.

(10) Patent No.: US 7,499,002 B2
(45) Date of Patent: Mar. 3, 2009

(54) RETRACTABLE STRING INTERFACE FOR STATIONARY AND PORTABLE DEVICES

(75) Inventors: Gabor Blasko, Budapest (HU); Chandrasekhar Naravanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 11/053,451

(22) Filed: Feb. 8, 2005

(65) Prior Publication Data

US 2006/0177227 A1    Aug. 10, 2006

(51) Int. Cl.
*G09G 5/00* (2006.01)
(52) U.S. Cl. .................... 345/3.1; 345/1.1; 345/156
(58) Field of Classification Search .................. 345/156, 345/1.1, 3.1
See application file for complete search history.

(56) References Cited

FOREIGN PATENT DOCUMENTS

CH    692433 A5 *   6/2002

\* cited by examiner

*Primary Examiner*—Kevin M Nguyen
(74) *Attorney, Agent, or Firm*—Scully, Scott, Murphy & Presser, P.C.; Gail Zarick, Esq.

(57) ABSTRACT

An interface for a small form factor electronic device by enabling explicit measurement of extension or retraction of a retractable cord by monitoring the amount of string that passes by sensors, as the string exits the enclosure of the device. Input to such small form factor devices may be provided by sensors that measure the length of a string or wire that has been pulled out of an enclosure, in addition to an angle or direction (e.g., in 1-, 2- or 3-dimensions) at which the string was pulled out. Additionally, the rate of acceleration for the pulling and retracting motion may also be used as additional forms of input. In a further embodiment, a string interface is provided for a small form factor device that communicates information in the form of a pixel display provided integral with the string in response to string manipulation.

1 Claim, 15 Drawing Sheets

RETRACTABLE STRING INTERFACE FOR STATIONARY AND PORTABLE DEVICES

FIELD OF THE INVENTION

The present invention related generally to small form factor electronic devices of the portable and stationary type, e.g., wrist watches, computers, telephones, PDA's, MP3 players and the like, and more particularly, to a novel retractable string interface for interacting with these devices.

BACKGROUND OF THE INVENTION

Electronic/electrical-powered devices that are small and portable typically provide for user input by a variety of means, including but not limited to: touchscreens with or without a stylus, a small form factor mouse device, jog button, toggles, dials, wheels, and button sets. One extremely small form factor device (e.g., a wristwatch device) the size of the device and the size of the display are very restrictive with regards to the placement of multiple input mechanism possibilities. Navigation of a 2D graphical interface furthermore, is not possible efficiently (not even with a stylus) for devices having touchscreen displays on the order of a square inch, and current methods for 2D navigation with buttons are very time consuming.

It would be highly desirable to provide a solution that addresses the problem of user input into a small and portable mobile or stationary device.

SUMMARY OF THE INVENTION

The presented solution proposes to solve the aforementioned problems by enabling explicit input to a small-form factor device by the user of a retractable string interface. Thus, there is provided a solution that advantageously enables and facilitates user input into small form factor stationary and portable/mobile devices using a retractable string or wire. Input to such small form factor devices may be provided by sensors and implemented signal processing logic that measures the length of the string or wire that has been pulled out of an enclosure, and alternately or in addition to, the angle (in a planar or spatial sense) at which the string was pulled out. Additionally, the rate of acceleration for the pulling and retracting motion may also be used as additional forms of input.

In a first aspect, the invention relates to an improved system for providing interactivity to an electronic device utilizing a retractable cord (string or wire) by enabling input and output interactivity with the electronic device via a graphical user display interface provided with the device.

In a second aspect, the invention relates to an improved system for providing interactivity with an electronic device utilizing a retractable cord (string, wire or optical fiber) by providing a novel user interface physically on the extended cord (string, wire, optical fiber) from which a user may obtain or otherwise visualize information or data provided by the device via the string itself.

According to a third aspect of the invention, each of the solutions for providing interactivity with an electronic device implements a novel sensor system that enables string length and angular measurement based on mechanical, conductance, or optical sensing solutions.

In the electrical solution, each plane of the exit hole has multiple conductive pads in a coaxial arrangement. The string itself has conductive pads placed on the exterior or embedded within the string. As the string is pulled off the spool while touching the side of the exit hole, as the conductive rings of the string make contact with the conductive pads on the side of the exit hole a circuit is closed, thereby generating an electrical signal. This electrical signal may be used to determine not only the direction and speed of string movement, but in case the pattern on the string encodes the length of the sting itself, then an absolute measure for the amount of string can be calculated.

Similarly to the electrical solution, instead of the conductive pads, optical sensors may be placed in coaxial arrangement along the sides of the exit hole which may generate signals indicating movement of the string by obscuring ambient light reaching the sensors. If the string has a pattern of lines printed on it's outside, then as different sections of the string pass by the optical sensor, based on the pattern of rings the direction, speed, and length of the pulled out or retracted string may be determined.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
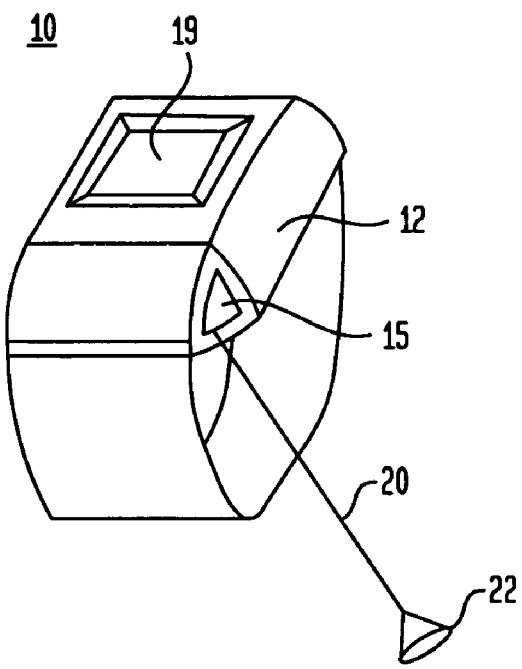
FIG. 1 depicts a small electronic device such as a wearable wrist-watch device having a housing from which a retractable cord may be extended from and retracted into to provide user interface functions with the device according to the invention.

With reference to the accompanying drawings, FIG. 1 depicts the implementation and use of a retractable cord, e.g., a string or wire, adapted for extension and retraction with the help of a spring loaded spool in both straight and angular directions, as an input mechanism into a small form factor stationary or portable/mobile electronic device. For purposes of illustration, the implementation and use of a retractable cord as an input mechanism for enabling graphical and user interactivity into a small form factor stationary or portable/mobile electronic device according to the present invention, is described for an example embodiment of a wearable wrist watch device. Without detracting from the scope of the invention, it is understood that the retractable cord for enabling graphical and user interactivity according to the invention can be implemented for other computer-controlled, programmable and/or electronic wired or wireless devices, including, but not limited to: personal digital assistants (PDAs); Internet appliances; MP3 players; cameras, cell or mobile phones, personal audio equipment such as Walkman products, etc.

Figure 2A:
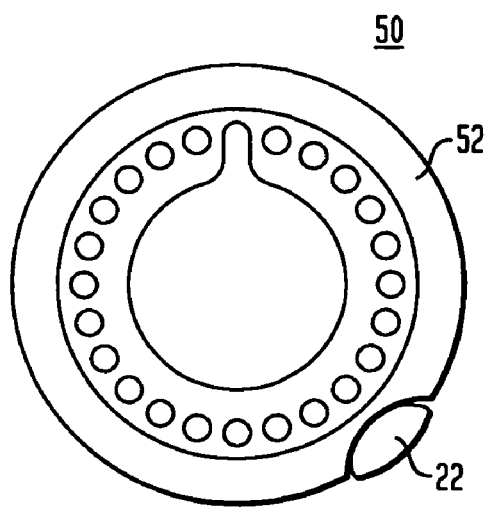
FIGS. 2(a) and 2(b) depict a wearable watch device having a rounded bezel including a housing having aperture of a shape configured, for example, to mate with at least a portion of the pull-cord grip at the end of the cord.
Figure 2B:
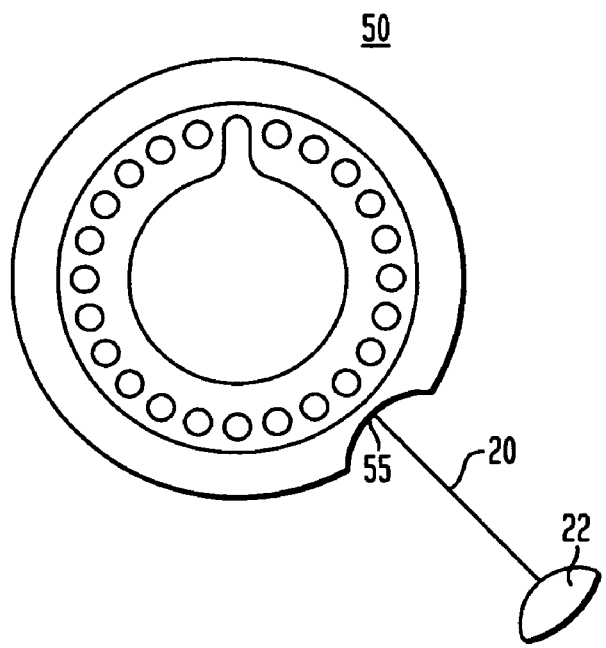

Particularly, as shown in FIG. 1, there is depicted a small form factor electronic device 10, such as a wearable wristwatch device, having a small graphical interface 19 and a housing 12 that includes an aperture 15 from which a retractable cord 20 may be extended from and retracted into. The aperture 15 in housing 12 is large enough to permit passage of cord 20 and small enough to not permit passage of a gripping structure, e.g. a pull-cord knob or head 22 at the end of the cord 20. This is more clearly depicted in FIGS. 2(a) and 2(b) showing a wearable watch having a rounded bezel 50 including a housing 52 having aperture 55 of a shape configured, for example, to mate with at least a portion of the pull-cord knob or head 22 such that the mated portion of the pull-cord knob structure 22 lies substantially flush with the housing when in a fully retracted position. Therefore, as shown in FIG. 2(a), when retracted, the pull-cord knob or head structure 22 rests against housing 52. The cord 20, and other cords identified hereinbelow, can be of any length depending upon the form factor of the electronic device. In one embodiment, although not shown, the cord 20 can include a stopper (not shown), such as a rubber or plastic washer, on cord 20 and proximate the pull-cord knob 22 in order extend the pull-cord knob or head structure 22 a certain amount when the cord is fully retracted. Such a stopper device is intended to facilitate a user's grasping and extending the cord.

Figure 3:
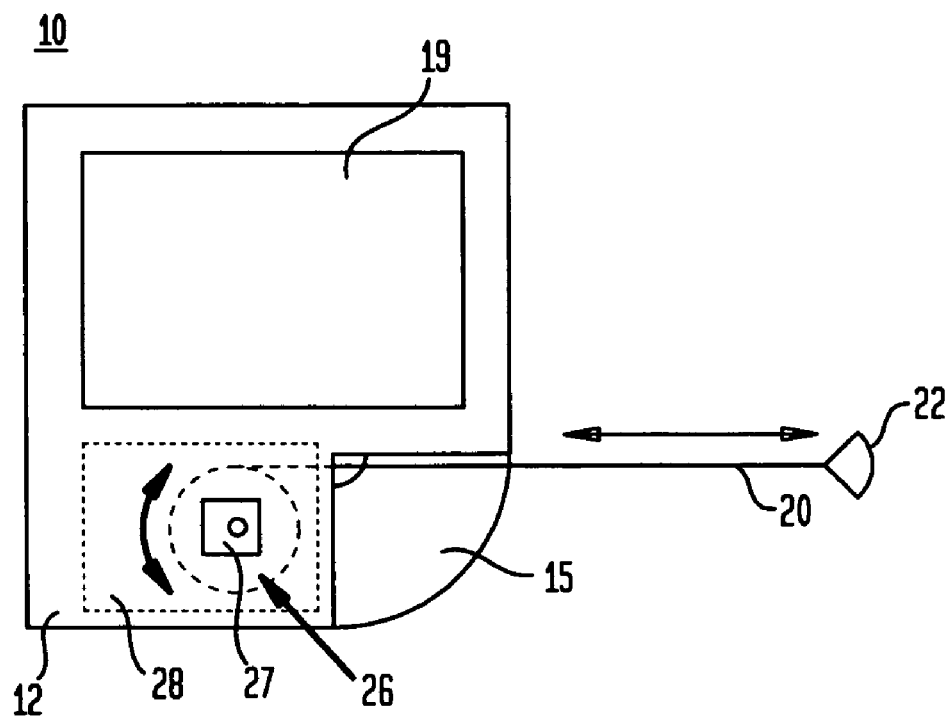
FIG. 3 depicts a separate retractable cord unit comprising a retractable mechanism such as a spool to facilitate extension and retraction of the cord.

As shown in FIG. 3, a separate retractable cord unit comprising a retractable mechanism to retract a cord 20 is provided internal or mounted externally to the housing of the small form factor electronic device 10. In one embodiment, the retractable mechanism includes a spring-loaded spool 26, however, may include any mechanism for retracting a cord and permitting extension of all or at least part of it. For example, a retractable mechanism may comprise a small motor that counter-pulls on the string using, for example, a powerful microelectromechanical system (MEMS) motor. As shown in FIG. 3, the spring-loaded spool 26 mounted internal to the housing 12 of the device 10, for example, in a corner section of the device 10. In operation, a user extends cord 20 by grasping pull-cord head or cap 22, and pulling it out of housing 12. A stop mechanism (not shown) provided within the housing 12 may hold the cord at particular extended positions so that it is not under tension from the spring-loaded spool or other retractable mechanism.

The device interface solutions utilizing the retractable cord of the invention as an input mechanism for an electronic device is based on a mechanical, conductance or optical sensing.

Mechanical-Based Sensing Solution

Figure 4:
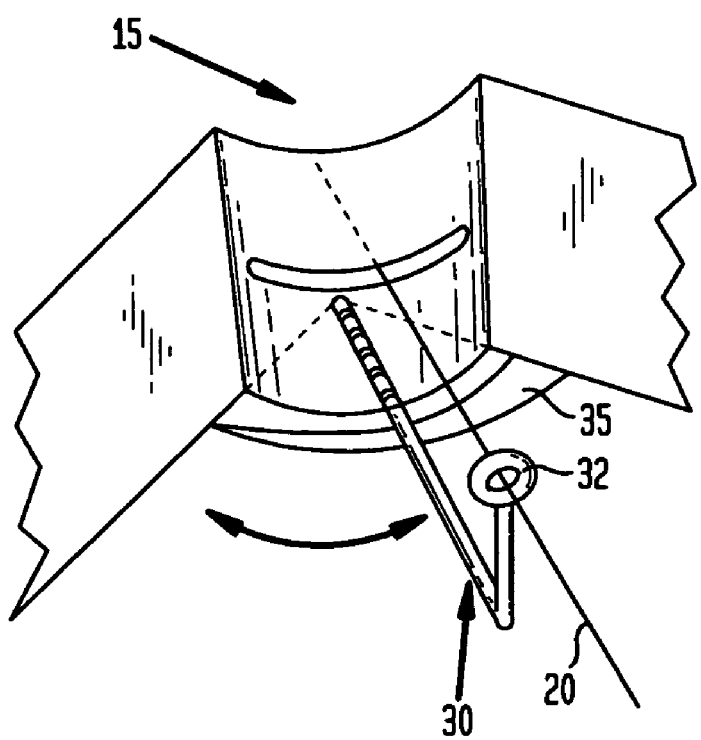
FIG. 4 depicts conceptually the cord extending from an aperture at a corner of the device that passes through a small hole mounted on an arm that is conductively connected, e.g., via a conductive strip, to a resistive sensor.

Computer-controlled, programmable, or other small form factor portable electronic/electrical-powered devices that require user input may greatly benefit from interfaces that can be quickly operated by the use of a retractable string or wire. Potential solutions implementing a retractable string for input to devices could conceivably require measuring the length of the string or wire that has been pulled out of a spool, for instance, in addition to the angle at which the string was pulled out. One mechanical-based solution for measuring the extended length of the string that is pulled off the spool includes providing a mechanical sensor 27 coupled to the axis of the spool for detecting how many rotations the spool has rotated. This sensing solution may implicitly measure the length of the string by monitoring the number of rotations that the spool has turned and performing calculations based on knowledge of the circumference of the spool. FIG. 4 depicts conceptually the cord 20 extended from aperture 15 at the corner of the device watch. The extended cord 20 passes through a small hole 32 mounted on an arm 30 that is conductively connected, e.g., via a conductive strip, to a resistive sensor 35. As the arm 30 moves along the conductive strip of the resistive sensor (like a potentiometer) a signal is generated that is representative of the angle. For larger angular movement of the arm 30, a larger analog signal is generated, e.g., the arm makes contact with the conductive strip along a longer portion of its length. As will be explained in greater detail, the combination of outputs from the mechanical sensor 27 and resistive sensor 35 is processed for input to a microprocessor or like programmable control device to determine the string parameters, i.e., length of extension, angle, etc.

Conductance-Based Sensing Solution

Figure 5:
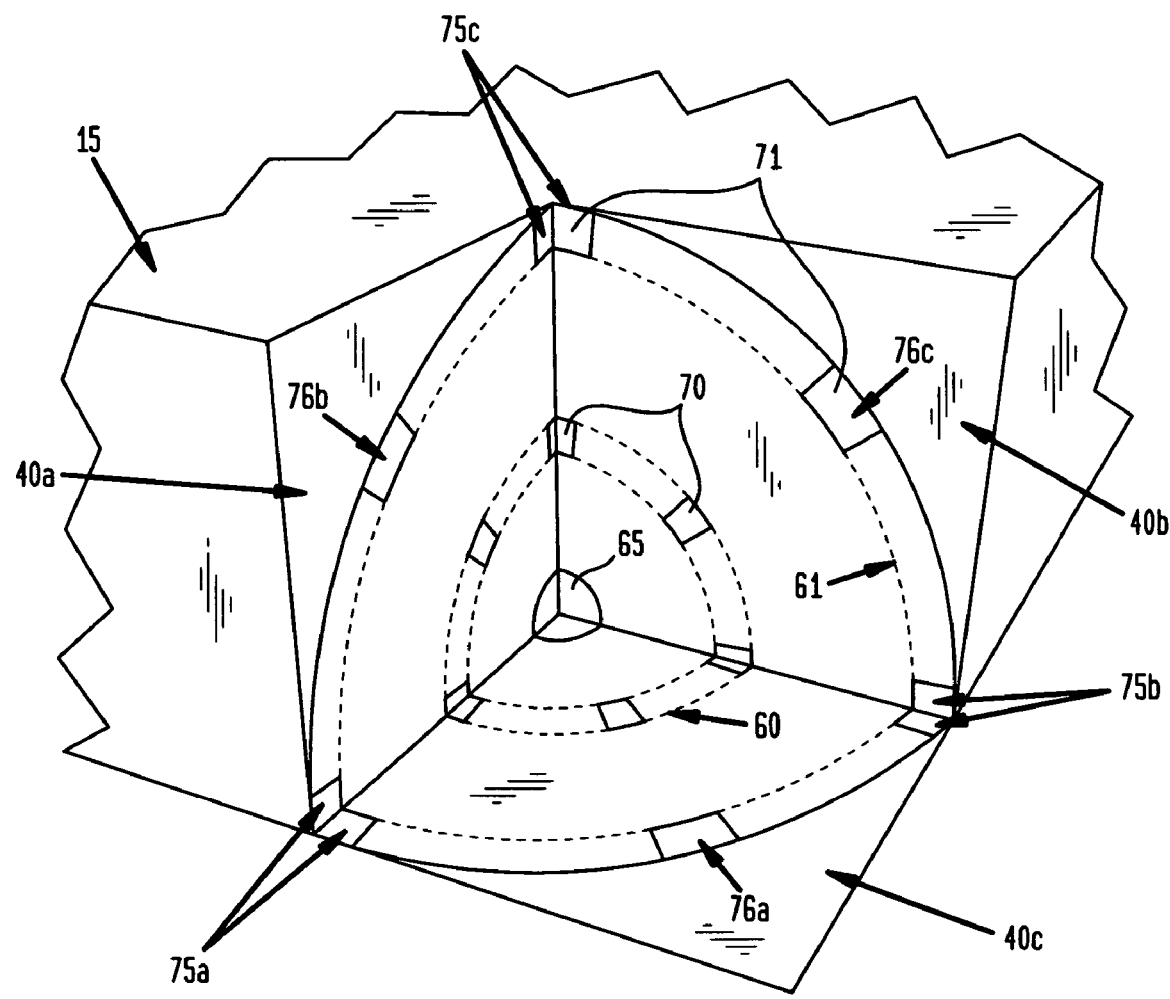
FIG. 5 depicts a detailed view of the aperture and exit hole from which the retractable cord is extended or retracted comprising at three intersecting surfaces having formed therein a plurality of optical or conductive sensors forming a novel string sensing solution according to the invention.

In accordance with the conductance sensing solution of the invention, FIG. 5 depicts a detailed view of the device aperture 15 comprising, for example, three intersecting planar surfaces 40a, 40b, 40c. On each exterior planar surface there is mounted or integrally formed an arrangement or array 60, 61 of conductive sensor structures or pads 70, 71, respectively, in a coaxial relation with the retractable string exit hole 65. As shown, conductive sensor structures or pads 70, 71 include a plurality of conductive sensors including X-axis, Y-axis and Z-axis sensor devices 75a, 75b and 75c, respectively, and further XY and ZX and ZY sensors 76a, 76b and 76c, respectively. As will be explained in greater detail, the combination of signal outputs from the conductive sensors 70, 71 are processed by electronic circuitry of the device, such as A/D converters, for example, for input to a microprocessor or like programmable control device to determine the string parameters, i.e., length of extension, angle, etc.

Figure 6:
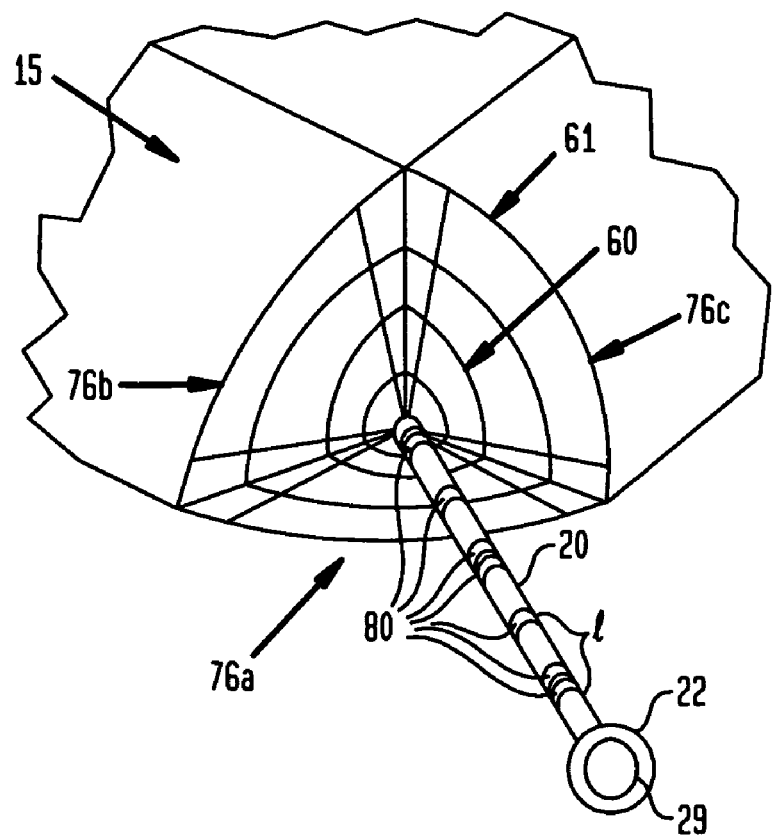
FIG. 6 depicts conceptually the retractable cord provided with conductive structures on its exterior layer or embedded within the string lengthwise along the cord.

Further to this embodiment, as depicted in FIG. 6, the retractable cord 20 itself is provided with conductive structures 80, e.g., conductive rings, on its exterior layer or embedded within the string itself. These rings 80 may be of different widths and may be placed at different distances, "l", lengthwise along the cord's outer surface. Similar to the use of barcodes, multiple conductive ring structures 80 of possibly different widths, may be placed very close to each other to generate specific coded information that is processed by the control device. For example, multiple conductive ring structures 80 of possibly different widths may be used to encode the total length of the string.

Figure 7A:
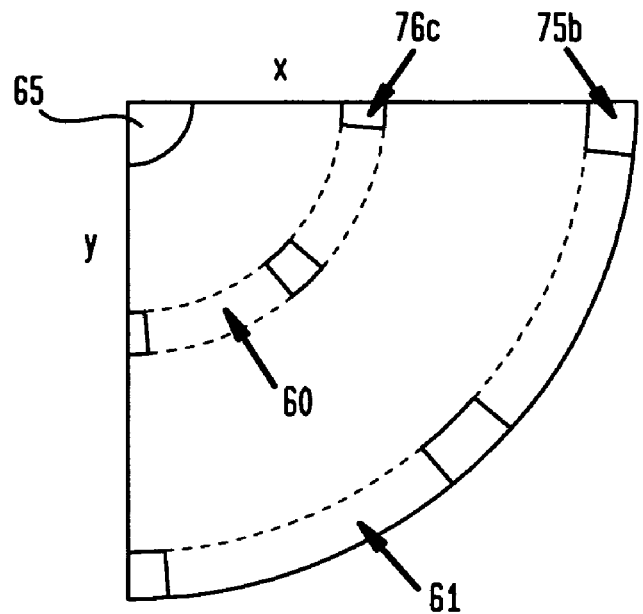
FIGS. 7(a)-7(e) depict an illustrative example of signals generated for determining cord extension length and angle of cord movement in response to conductive structures contacting conductive sensors.
Figure 7B:
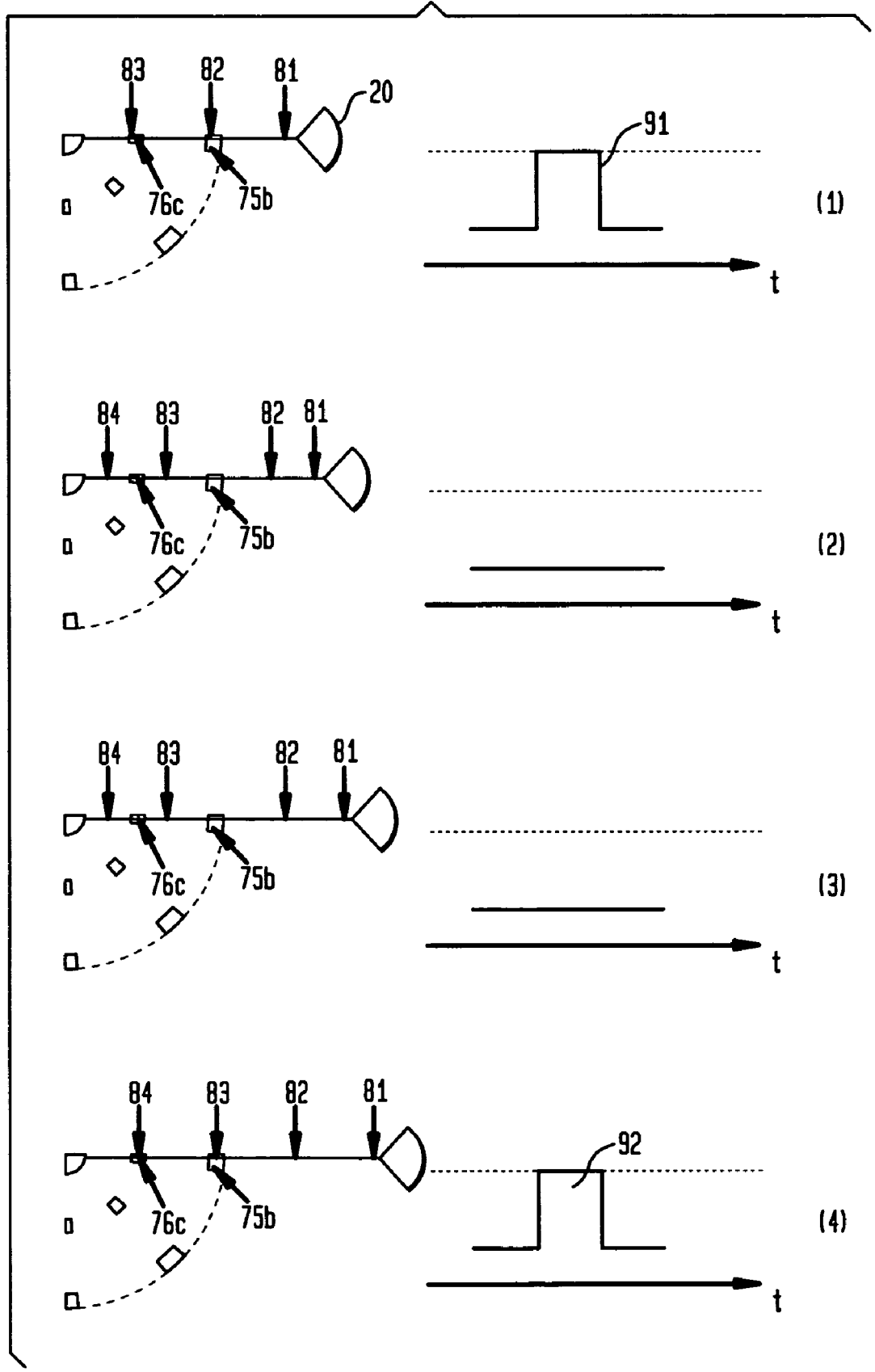

FIGS. 7(a) and 7(b)(1)-(b)(4) depict an illustrative example of signals generated for determining length of the cord extension by the conductive sensors, e.g., 76c, 75b located in the XY plane (corresponding to defined aperture surface 40c, for example, depicted in FIG. 5) at instances when the cord 20 having spaced apart conductive structures, e.g., conductive rings 81, . . . , 84 is being extended along a single axis. In this embodiment, the conductive sensors 75b, 76c at edges of the exit hole 65 are charged with a small voltage. With the retractable cord 20 at a ground potential, a circuit is completed if the conductive string makes contact with one of the conductive pads of the exit hole. Additionally, the corners of the exit hole may contain independent conductive pads (not shown), which are only contacted if the string is pulled in the direction of one of the primary axes. Thus, for example, as the cord 20 is pulled off the spool while touching a side of the exit hole 15, the conductive rings 81, . . . , 84 of the cord make contact with the conductive pads 70 or 71 on the plane. With each ring/pad contact, a circuit is closed, thereby generating an electrical signal. In an example operation, FIG. 7(b)(1) depicts the cord 20 pulled to an extent such that conductive rings 82 and 83 contact the respective conductive sensors, 75b, 76c generating a signal 91. As the cord is extended further as depicted at instances shown in FIG. 7(b)(2) and FIG. 7(b)(3), none of the conductive rings 81, . . . , 84 are contacting a conductive sensors, 75b, 76c, thus no signal is generated. Continuing in extension, FIG. 7(b)(4) depicts the cord 20 pulled to an extent such that conductive rings 83 and 84 contact the respective conductive sensors, 75b, 76c generating a signal 92.

Figure 7C:
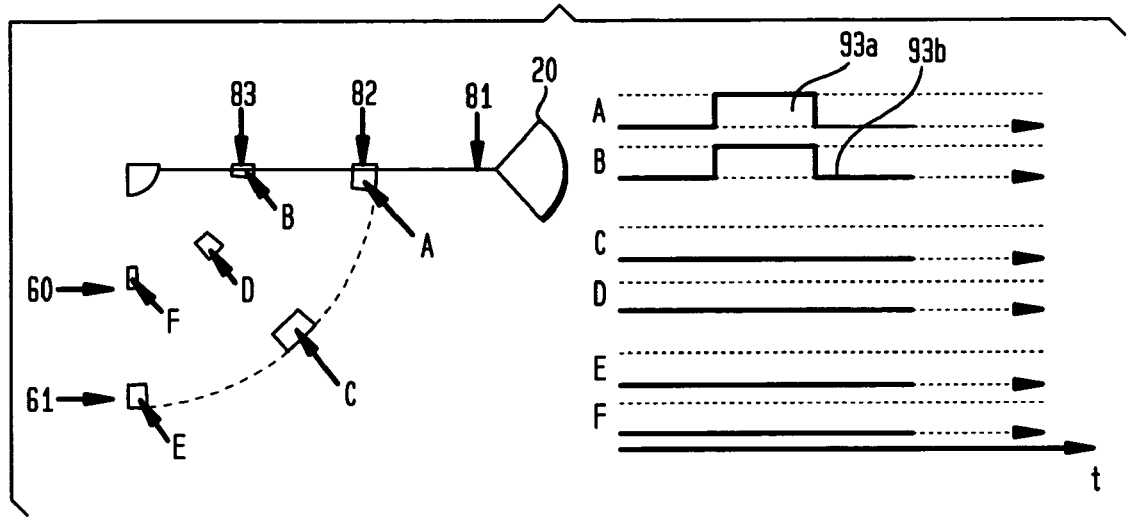
Figure 7D:
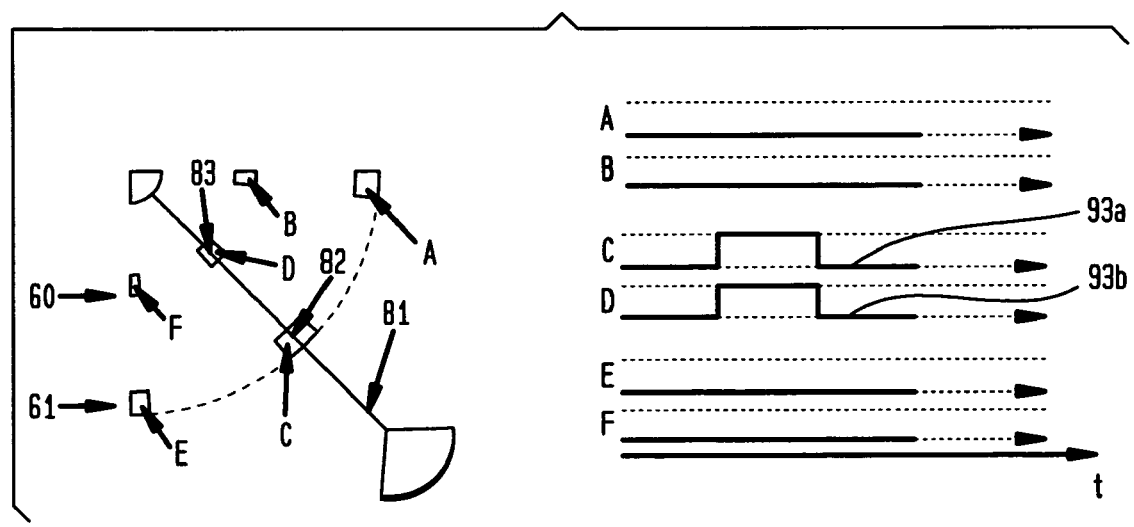
Figure 7E:
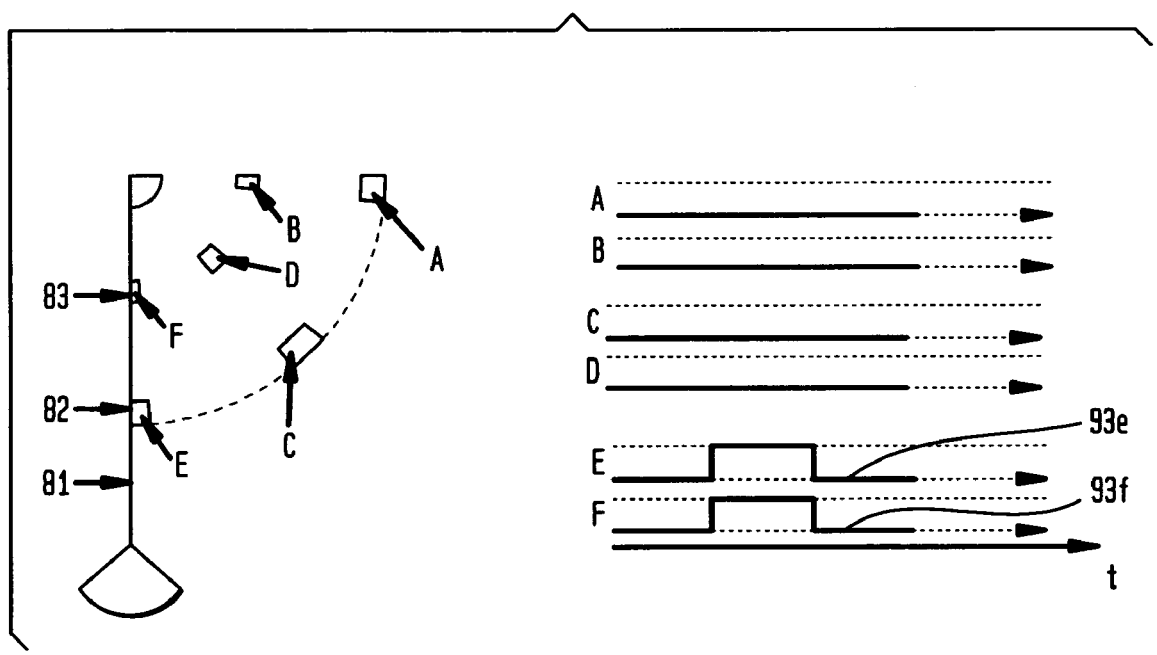

The method described herein with respect to FIG. 7(b) for determining length of the cord extension may be similarly used to detect an angle the retractable cord 20 makes with respect to an axis. Thus, as the cord 20 is pulled out along one of the planes of the exit aperture it makes contact with one of the conductive sensors, thereby creating a conductive connection with the pad element. This closes a circuit, which can be sensed and therefore it can be determined which angular section the wire is passing over. For example, as shown in FIG. 7(c), conductive sensors located at the defined aperture surface (XY plane, for example) and indicated as sensors A, C, E along the coaxial arrangement 60 and conductive sensors indicated as sensors B, D, F, along the coaxial arrangement 61, for example, may be used to detect an angle the retractable cord 20 makes with respect to an axis at various instances. Thus, in an example operation, FIG. 7(c) depicts the cord 20 pulled to an extent such that conductive sensors 82 and 83 contact the respective conductive sensors, A, B generating corresponding respective signals 93a, 93b at the instant of time depicted. As further shown in FIG. 7(c), as no contact is being made with conductive sensors, C-F, no other signals are generated. When the extended cord is manipulated in an angular direction as depicted at instances shown in FIG. 7(d) and conductive rings 82 and 83 contact the respective conductive sensors, C, D, corresponding respective signals 93c, 93d are generated at the instant of time depicted. As further shown in FIG. 7(d), as no contact is being made with conductive sensors, A, B and E, F, no other signals are generated. When the extended cord is further manipulated in an angular direction as depicted at instances shown in FIG. 7(e) and conductive rings 82 and 83 contact the respective conductive sensors, E, F, corresponding respective signals 93e, 93f are generated at the instant of time depicted. As further shown in FIG. 7(e), as no contact is being made with conductive sensors, A, B and C, D, no other signals are generated.

Optical-Based Sensing Solution

Figure 8:
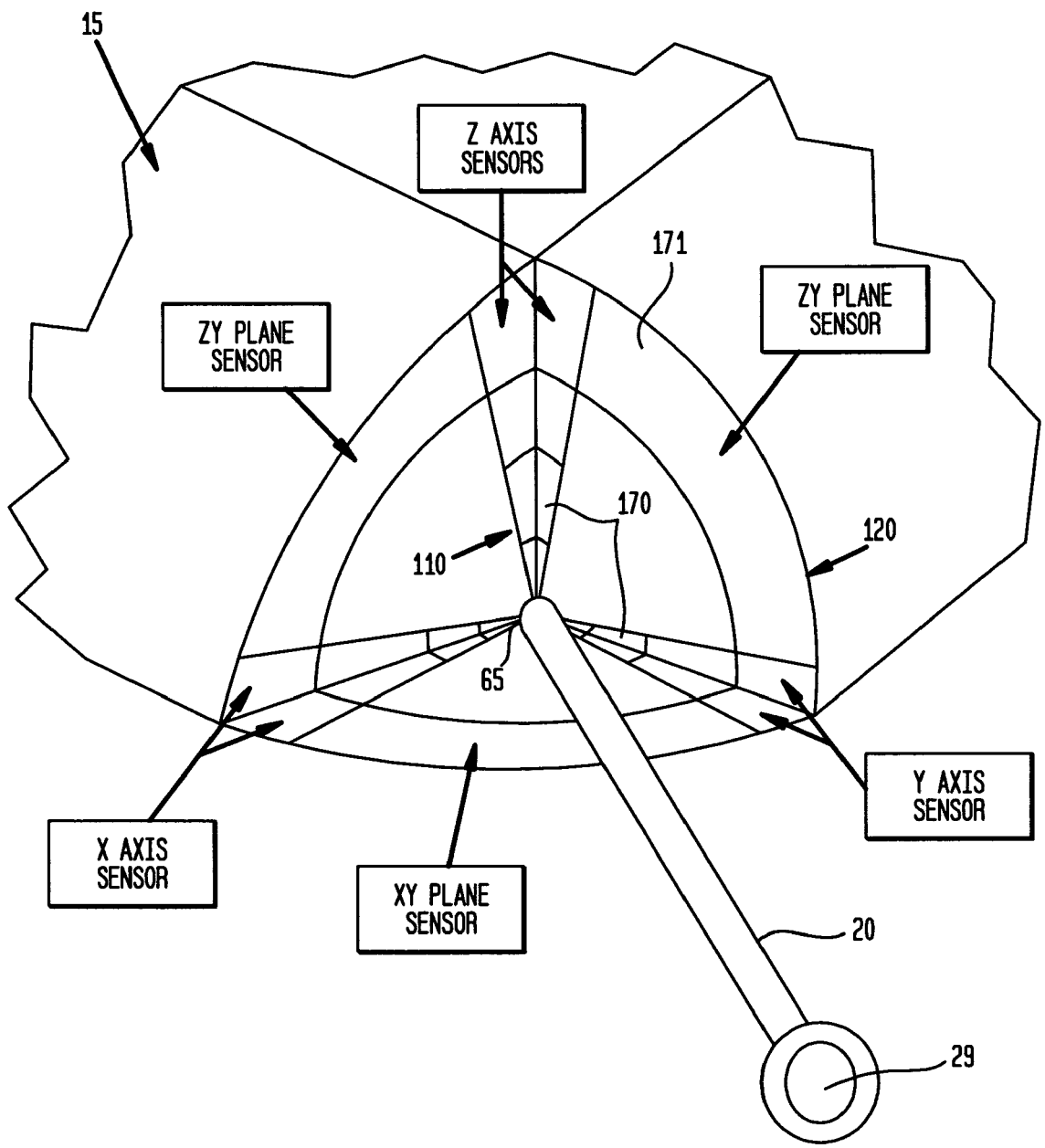
FIG. 8 depicts conceptually an optical sensing solution whereby on each of the three exterior intersecting surfaces forming aperture there is mounted or integrally formed an arrangement or array of optical sensor structures or pads.
Figure 9:
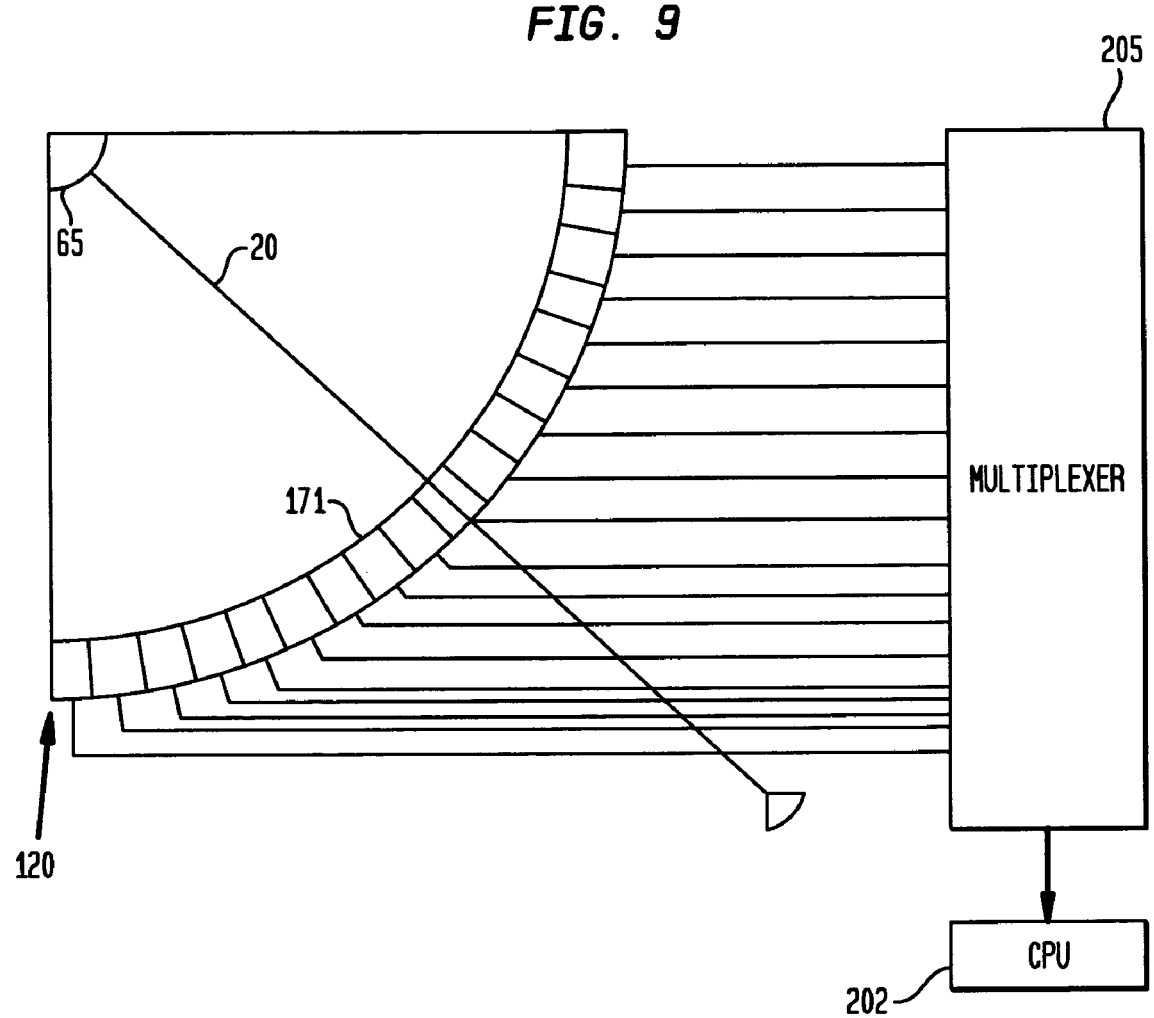
FIG. 9 depicts a contiguous array of optical sensors in a coaxial arrangement along the sides of the exit hole where the cord obstructs the ambient light entering the sensor to provide a signal that can be processed by a microcontroller according to an optical sensing solution of the invention.

In accordance with the optical sensing solution of the invention, optical sensors are placed on the edges/corners of the string's exit hole and detect if a section of the sensor is receiving less light—due to the occlusion caused by the string resting on the sensor plane—than other sections of it. Thus, as shown in FIG. 8, on each of the three exterior intersecting planar surfaces of aperture 15 there is mounted or integrally formed an arrangement or array 110, 120 of optical sensor structures or pads 170, 171, respectively, in a coaxial relation with the retractable string exit hole 65. As generally shown, optical sensor structures or pads 170, 171 include a plurality of conductive sensors including X-axis, Y-axis and Z-axis sensor devices and XY and ZX and ZY sensors. Similar to the conductance sensing solution, instead of the conductive pads, optical sensors or an contiguous array thereof as shown in FIG. 9, are placed in the coaxial arrangement along the sides of the exit hole. When the retractable string or wire 20 passes over a particular sensor, the wire obstructs the ambient light entering the sensor. This provides a signal which can be processed by a microcontroller, e.g., CPU 200. A multiplexer 205 is provided to transform the single binary signals received from the sensors 171 into a multi-digit binary code. In the embodiment of the invention depicted in FIG. 9, each sensor element 171 in arrangement 120 is a light emitter and a light sensor in one. The retractable wire 20 that passes over one of these elements is covered by a reflective material. When the wire passes over a particular element the light emitted by the element reflects off the wire are is received by the light sensor providing a signal that is multiplexed to the CPU 202 to identify the particular element (angular subsegment) and thereby a particular angle range (e.g., 40° to 45° segment depicted in FIG. 9). Although not shown, it is understood that, further to the optical sensing solution, the retractable cord 20 may be provided with a pattern of lines printed on it's outside, as different sections of the string pass by the optical sensor, based on the pattern of rings, the direction, speed, and length of the pulled out or retracted string may be determined.

Irrespective of the particular mechanical, conductive, or optical sensing solution provided for the retractable string interface of the invention, as further shown in FIGS. 6 and 8, there is depicted the provision of a button actuator mechanism 29 provided at the knob end 22 of the retractable wire 20. By activating button 29 placed at the knob end 22 of the retractable cord 20, the user (together with the other string parameters) may initiate entry functions, e.g., by activating graphical user elements (similar to button clicks) and entering commands or alphanumerical characters, perform cursor or object drag and drop functionality, etc.

Figure 10A:
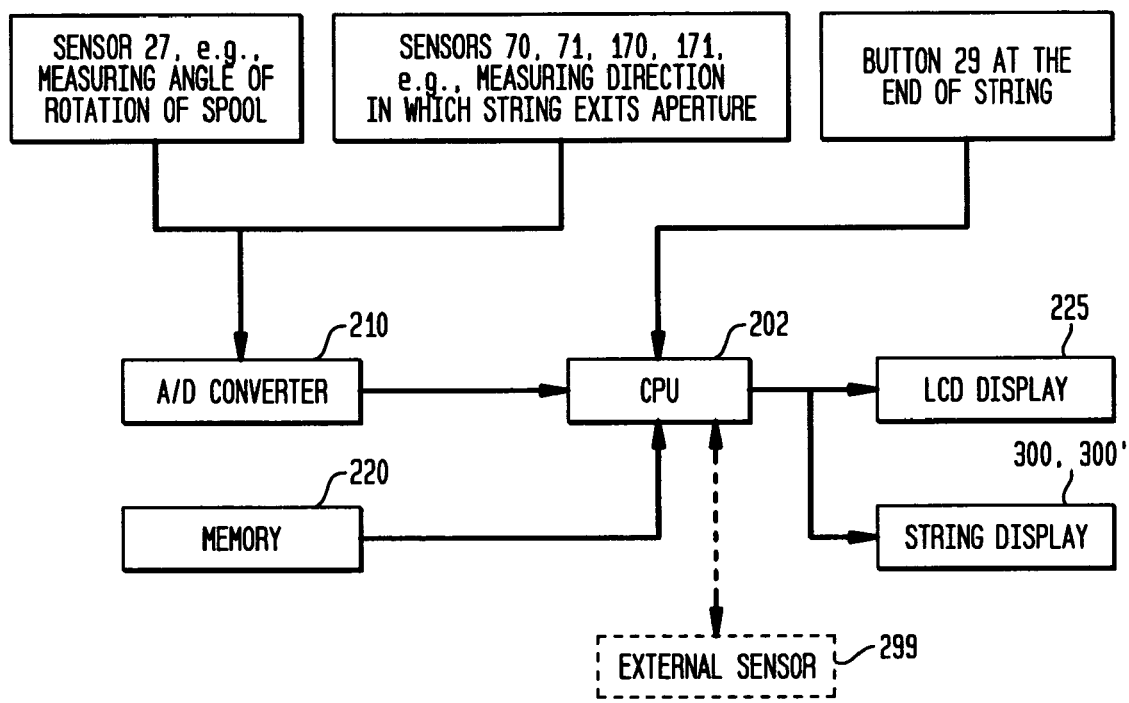
FIG. 10(a) depicts a processing unit that may be implemented in a small form factor electronic device including the retractable string interface adapted with the mechanical, conductive, or optical string sensing solutions for enabling user interaction with the device according to the invention.

FIG. 10(a) depicts a processing unit 200 that may be implemented in a small form factor electronic device including the retractable string interface adapted with the mechanical, conductive, or optical string sensing solutions for enabling user interaction with the device according to the invention. As shown in FIG. 10(a), for instance, each of the mechanical sensors 27 for measuring angle of rotation of spool and the length of extension, and the conductive sensors 70, 71 (FIGS. 5, 6) or optical sensors 170, 171 (FIG. 8) for measuring direction in which string exits aperture are input to an analog/digital (A/D) converter device 210 for converting analog signals into digital signals in a form suitable for input to the CPU 202. Furthermore, activating button 29 placed at the knob end 22 provides further input directly to the CPU 202 which may comprise a single-chip embedded controller for ultra-low-power applications, and armed with processing and enhanced memory management features to function equivalently as a current MHz or GHz Pentium® (trademark of Intel Inc.). The core processing unit may operate at low voltages, e.g., 2.5 V, and, may be equipped with devices adapted to generate a main frequency clock and timing signals (not shown) and, provide all sufficient nonvolatile and volatile memory 220 that supports the system code enabling functionality according to the invention. Thus, as depicted in FIG. 10(a), the sensors are electrically coupled with the processing circuitry 200 of the device, including A/D and control processor devices that are programmed to measure the amount of cord (length) that is pulled from the spool and determine the spatial angle at which the string was pulled in three dimensions. The process depicted may further be used to additionally detect the acceleration of the extended/retracted motion of the cord. That is, knowing the length of the string that is pulled in a unit time, as tracked by internal clock mechanism controlled by a microprocessor, a string acceleration may be determined to provide additional display control. The processing circuitry 200 shown in FIG. 10(a) is additionally programmed to determine from the electrical signals received not only the direction and speed of string movement, but in case the pattern on the string encodes the length of the sting itself, then an absolute measure for the amount of string can be calculated.

Figure 11A:
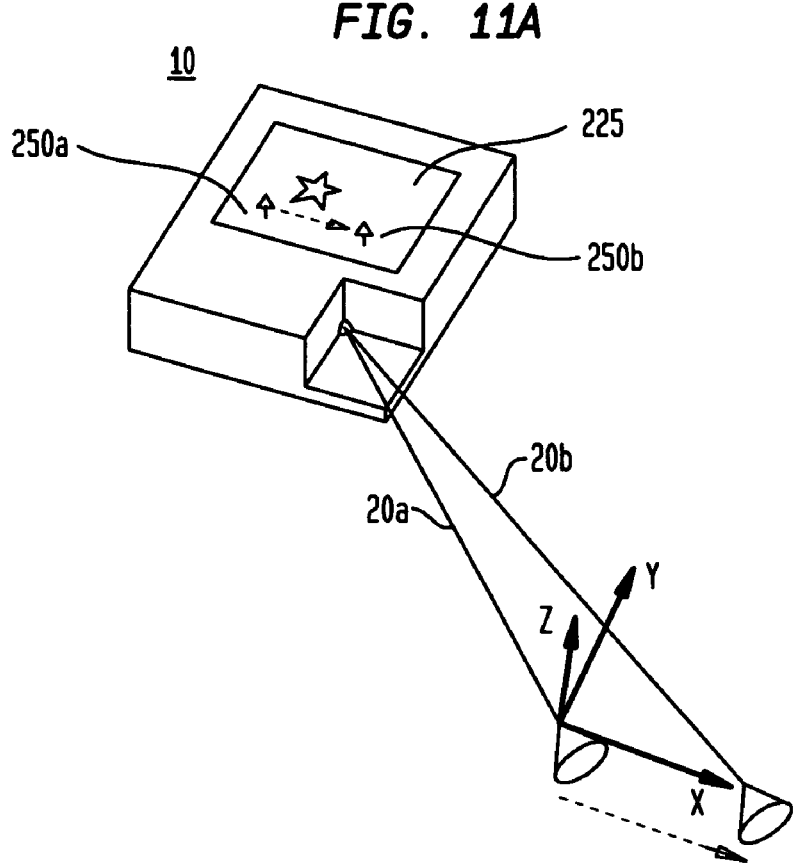
FIGS. 11(a)-11(d) depict an illustrative example of a user's interaction with a display interface provided with a small-form factor device and particularly controlling movement of a displayed cursor, icon or like display object in response to cord manipulation.
Figure 11B:
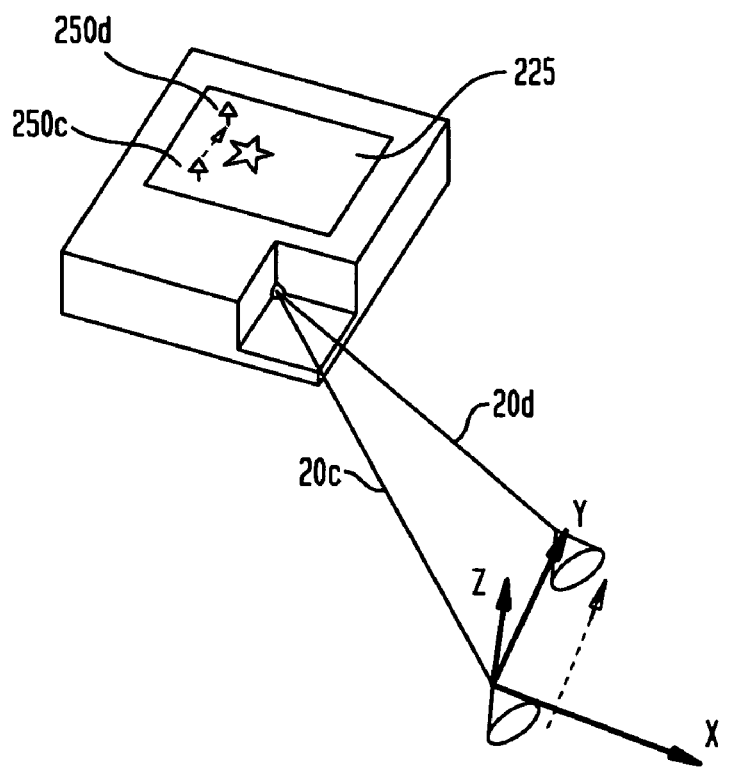
Figure 11C:
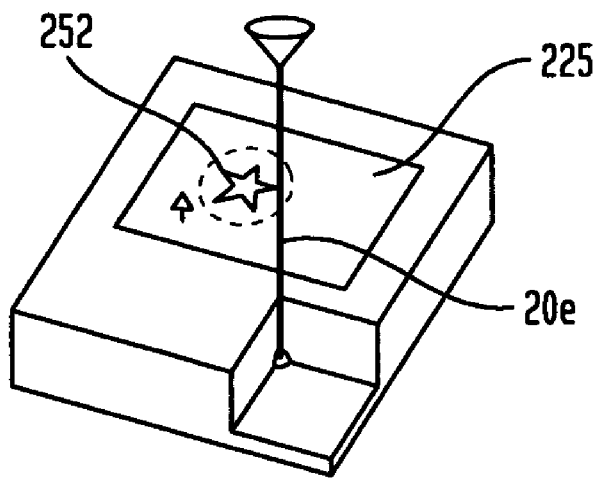
Figure 11D:
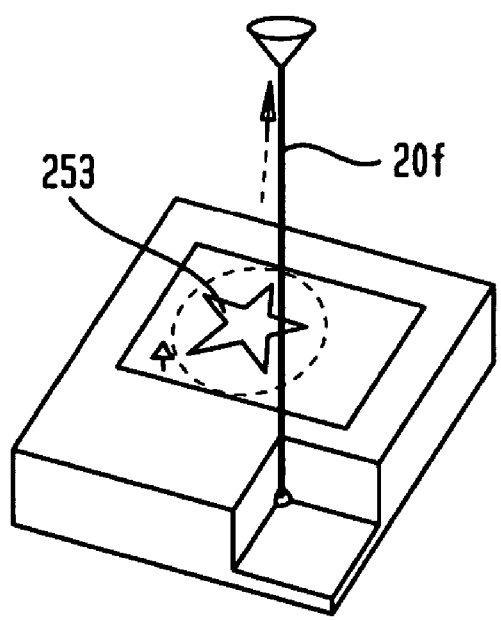

As described with respect to FIG. 10(a), the use of the mechanical, conductive, or optical string sensing solutions for detecting the motion of the retractable cord 20 and enabling user interaction with the device according to the invention preferably detects: the amount of cord length that is pulled from the spool; and, the angle at which the string was pulled, and additionally the acceleration of the extended/retracted motion of the string. These parameters are mapped by the processing circuitry 200 to control a user interface, e.g., a graphical user interface 225 such as provided via a display device such as an LCD, OLED, LED, projection display, etc., or, as will be explained in greater detail herein, with an interface 300 or 300' provided directly on the string 20. Additionally, these parameters are mapped by the processing circuitry 200 to enable movement of a cursor or object on the display interface 225 for initiating/controlling device functionality. That is, irrespective of the sensing solution, according to the invention, knowing the length of the cord that was pulled, and the angle at which the cord was pulled from the device a 2D—2D mapping can be applied to the input data (angle, length) that can be transformed into traditional graphical input X,Y (vertical, horizontal) coordinate values. By pulling out the string at a certain angle, for example, in the plane of the wearable device's display, the two dimensional (horizontal, vertical) motion of the knob at the end of the string may be mapped to a corresponding 2D planar-motion of a cursor on the screen of the device, or the cursor movement on an external device. This cursor movement may comprise a highlight, e.g., for navigating to or selecting items from a displayed list. More particularly, a user is able to navigate a graphical user interface by pulling the cord 20 and moving the knob end 22 (counter pulling with the spool's spring responsible for retracting the string) in either a 1-D line, a 2-D plane, or 3-D space. For example, as shown in FIG. 11(a), the extended cord 20 may be manipulated from position 20a to 20b by a user to move a displayed cursor, icon or like display object 250 shown in the display interface 225 along an X-axis direction from position 250a to 250b. Likewise, as shown in FIG. 11(b), the extended cord 20 may be manipulated from position 20c to 20d by a user to move a displayed cursor, icon or like display object 250 shown in the display interface 225 along an Y-axis direction from position 250c to 250d. Furthermore, as shown in FIG. 11(c), the cord 20 may be manipulated to a first position 20e which enables a selection of a particular object 252 shown in the device display interface 225 and, then, as shown in FIG. 11(d), manipulated for extension in a Z-axis direction to a position 20f to initiate magnification (zooming) functionality of the selected displayed object resulting in a zoomed selected object 253. Further functionality of the interface 225 may differ based on which direction the string was pulled out of the corner of the device. Notwithstanding these illustrative examples, cursors, icons or other objects in the display interface 225 the may not only be controlled by measuring the angle at which the cord was pulled and/or the length of the cord pulled, but for the instance the cord 20 is pulled in all three dimensions of space, the functionality of the interface may depend on which plane of the 3D space the cord is moved along.

Moreover, while the angle and length of the cord may contribute to screen display activity when the string is pulled out, it should be understood that once the string is pulled out to a certain length, the user may still move the cord in the plane thereby changing just the angle and, within a certain constant angle, the length may be modified. For example, a user may navigate to a first state, e.g., by quickly pulling out the string a predefined amount of length (e.g., x inches). Then, this state is modified by slowly letting back or, pulling out the string further. Thus, for example, the quick pull may navigate a user to one node in a menu tree and the slow length adjustment itself may be the input that specifies navigation within that menu tree node. Thus, post-pulling, length and angle adjustments, as well as post-quick-pull slow length adjustments serve as additional forms of input and possible methods of changing an application's state.

Referring back to FIG. 1, in a further embodiment of the invention, the spool is coupled with a generator device or dynamo 28, which provides a form of energy generation for the device 10. For example, energy conversion circuitry provided with generator device 28 is adapted to convert energy from pulling action of the retractable string or cord 20 from off the spool into energy that may be used to recharge a battery, for example. Note that generator device 28 may comprise a small motor, which, when operated in reverse, may work as a generator for the small device, providing a mechanism to generate power in and recharge the devices' batteries in response to pulling the cord 20 from the spool. The small motor may function as a "haptic spindle" with virtual detents as will be explained in further detail below.

String Interface Solution

In accordance with another aspect of the invention, there is provided a novel interface for a small form factor device comprising individual light sources, e.g., light emitting diodes (LEDs), placed within or on the cord 20 that is pulled out by the user, that provide an informative indication relating to user interface content. That is, the invention further provides a mechanism enabling a user to glance at the cord itself, as if were a part of the small display screen. Strings are rarely used to display information, however there are examples to encoding information on strings. Akin to the concept of using knots tied on different portions of a string to indicate to a sailor weather and water depth information, or providing a "Morse-code" style pattern to encode a message onto a string in the form of knots, the present invention extends on this concept by providing light emitting diodes into the retractable cord itself, and use the cord as a small and retractable single-pixel linear display system. The pulling mechanism of the string based interface may be used to control different application parameters, both continuous and discrete.

Figure 12A:
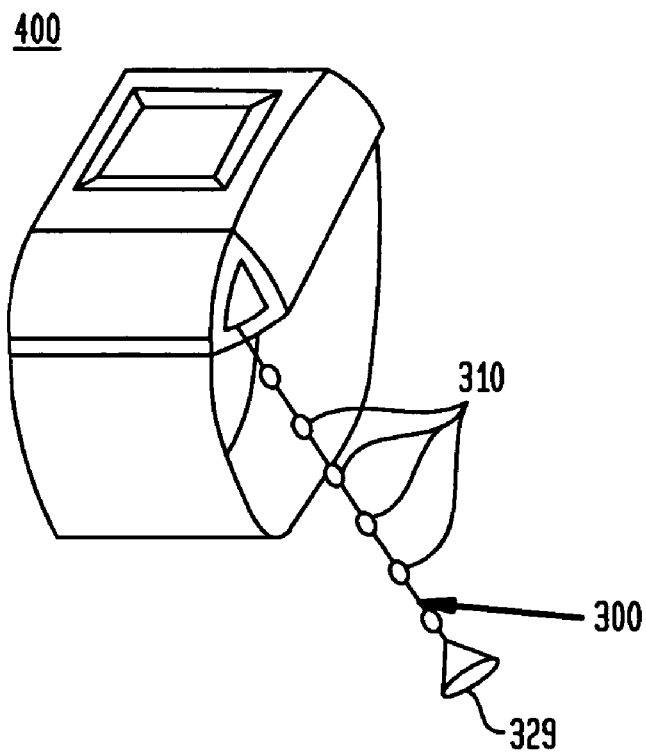
FIGS. 12(a) and 12(b) depict embodiments of a small form factor device 400 having a retractable string interface 300, 300' comprising a plurality of individual light emitting structures receiving signals that may be lit to indicate device generated information for detection by the user; and, FIG. 13 depicts one embodiment of a retractable string interface 300' for a device comprising a plurality of optical fibers carried in a transparent sheath or like flexible tube or container.

FIG. 12(a) depicts a small form factor device 400 having a retractable string interface 300 comprising a plurality of individual LEDs 310 arranged in a linear dimension for receiving signals that may be lit for indicating to a user device generated information. LED devices 310 that may be used include ultra thin and small design (e.g., a 1.0 mm×0.5 mm×0.5 mm specification provided by Kingbright Electronic Co., Ltd. that comes with an GaN blue LED chip which provides the luxury of having blue indication in an application with a fraction of the cost of the tradition blue SMD LED). Alternatively, the retractable string interface 300 may comprise a plurality of independently addressable electronic-ink (e-ink) display structures instead of LEDs. The advantage being that electronic-ink is more power efficient, requiring energy only to change the state of a pixel. The advantage of LEDs however is that they can emit light in the dark ambient, therefore the information displayed by the retractable string display may be viewed in dark environments.

Figure 12B:
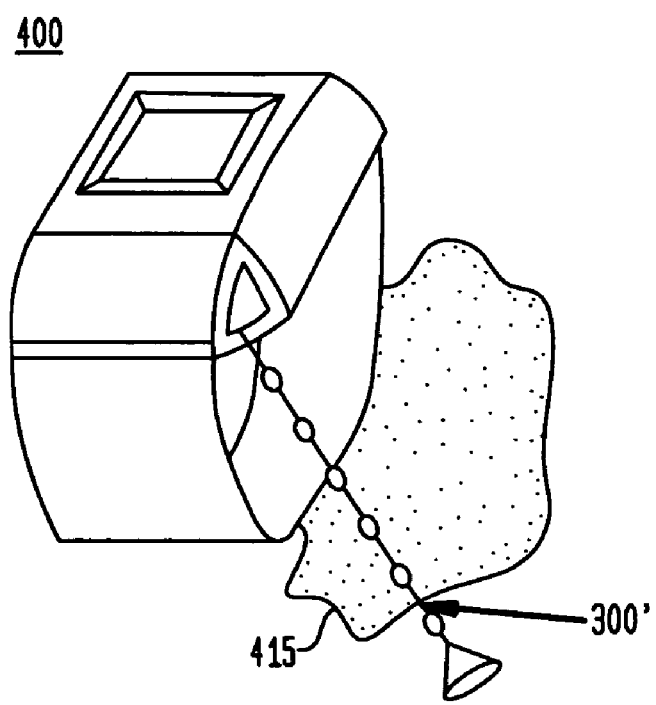
Figure 13:
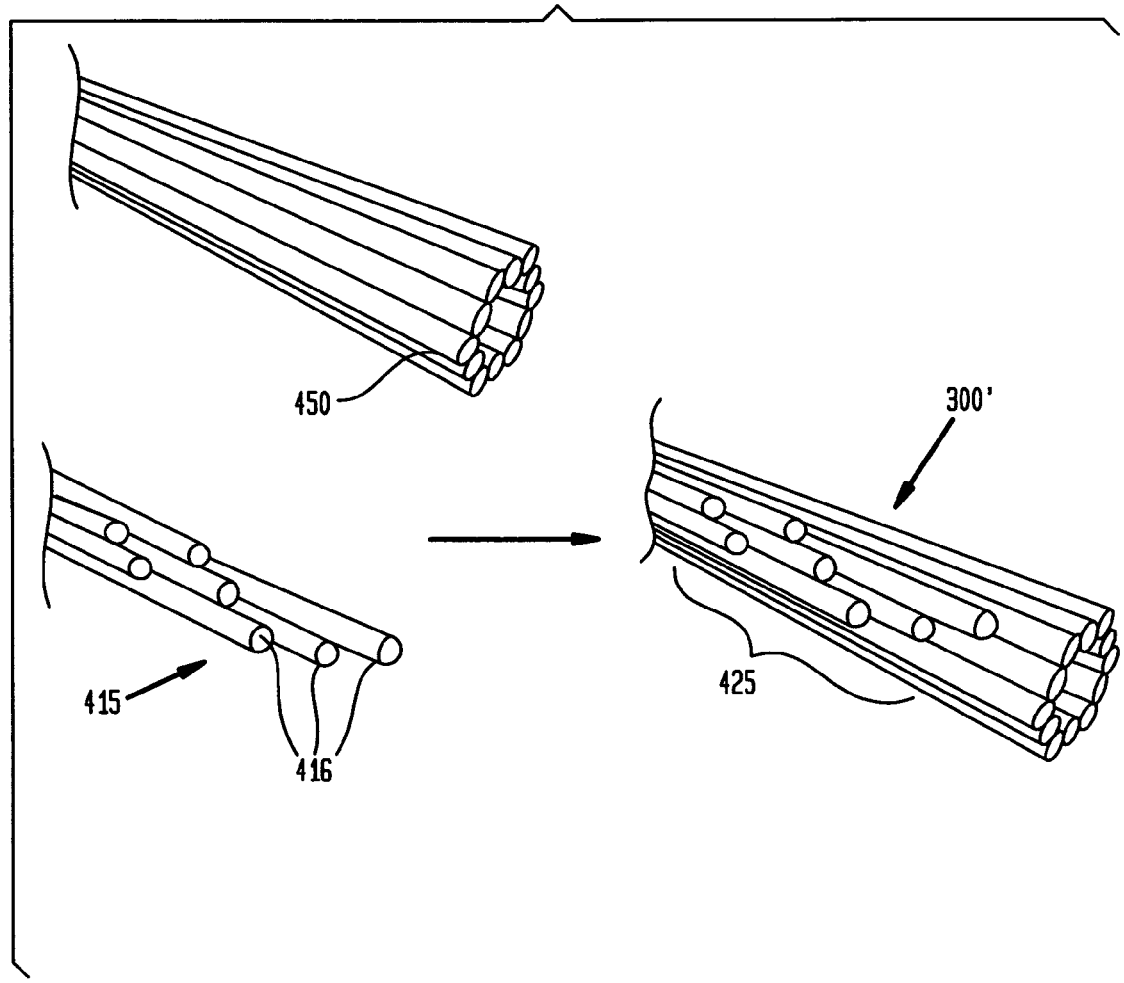

In greater detail, as shown in FIG. 12(b), the retractable string interface 300' comprises a plurality of independent optical fibers 415 each provided for carrying signals and adapted to emit a light of a specific frequency. FIG. 13 particularly depicts one embodiment of a retractable string interface 300' for a device comprising a plurality of optical fibers 415 carried in a transparent sheath or like transparent flexible tube or container 450. Each optical fiber 415 in the retractable string interface 300' may channel light from an operatively coupled LED or electronic-ink display source (not shown) at one end of the fiber, e.g., inside the device body, to different sections of the cord as shown in FIG. 13. That is, the fibers 415 which carry the light may be terminated at different lengths along the cord. Preferably, small diffuser devices 416 are provided at the end of the optical fiber to distribute the light out of the fiber (thus acting as a displaced light source). As the LED or electronic-ink display source are independently addressable, a message or information according to a specific light pattern of color(s) 425 may be displayed.

In an example application, a small form factor PDA or smart watch device may be commanded to check a user's schedule for a current day, find an empty time slot and generate a display via the retractable string interface 300, 300', indicating the empty time slot without the user having to navigate the device display. That is, the display may be generated in response to pulling out the string or cord 20 for the user to view which pixels are lit up. In this example operation, different colored LEDs may either represent different sections of time (yellow for hour, orange for 15 minutes, etc) and lit/unlit state may represent occupied or vacant states of the corresponding time slot.

Note, that if the string is pulled out, as shown in FIG. 12(a), a button 329 at the end of the string may be pressed to change the state of the single-pixel display. For example, upon pulling out the string, the entire length of the string may be mapped to 24 hours of the day, however by pressing the button, the display may change to mapping the length of the string to only a 12 or 6 hour section of the day with smaller discrete time increments. Different states of the LEDs at the two ends of the string may display different patterns to indicate the mapping of the string to time.

Note that in case the small form factor device is equipped with a traditional 2D display (e.g. LCD) then that display and the retracting string display may work together, as the string 20 functions as a display interface 300/300' itself. For example, the user pulls out the string quickly (acceleration may matter) to it's full length in order to see that user's full day's schedule, however as the user slowly allows the spring loaded spool to retract into the body of the wearable computer, the traditional display may show detailed information about the time slot the lit/unlit LED-on-the-string of which is about to be retracted into the device.

If the string is pulled out, the linear single-pixel LED array may also create a 3D LED display, in case either an accelerometer based sensor placed in the knob 329 at the end of the string 20 or, a sensor at the edge of the aperture 15 measures the speed at which the string is swung back and forth (or, rather from a horizontal pulled out to a vertical pulled out position) quickly and correspondingly alters the LEDs that are displayed displayed.

If the device is a wrist-worn device and used while the user is moving, then it is recommended to have the interface to only be sensitive to input in case the string is at the two ends of the cavity. Thus, in the embodiment depicted in FIG. 1 of a smart wrist-watch device 10, the spool and the knob of the string are located at the lower right corner of the device, and the device itself is worn as a watch on the left forearm, then the user can comfortably pull out the string towards the right towards the left hand, downward, or upward (perpendicular to the surface of the watch).

The 3D space in which the end of the string/gripper knob may move may be divided into different virtual planes. The movement of the end of the string may jitter, therefore it is recommended that these subplanes be further divided into 45° slices. In case the three directions are (E—East (from watch toward hand along the horizontal axis of the watch), S—South (down along the vertical axis of the watch), U—Up (upward direction perpendicular to the surface of the watch) then the major directions that should be used for more robust interface which is less prone to error are: E, S, U, SE (southeast, e.g., as shown in FIG. 11(a) if pulled along line 20a from aperture), SU, EU (east and pull-up and away from the screen perpendicularly, as in FIGS. 11(c), (d)).

In a further embodiment, the string interface may react differently based on the length of the string that was pulled off the spool. In order to further facilitate the use of the sting interface, mechanical nubs may be felt by the user. It is also possible to use the string as a haptic interface, by making the spool of the device into a motor/generator (dynamo), which may apply different levels of torque in order to simulate a detents that the user cannot see, while pulling out the string. Haptic feedback may be provided whereby virtual detents are implemented at equal lengths or some pattern of virtual detents are provided that correspond to the screen display as the user pulls the cord out.

Applications

Figure 10B:
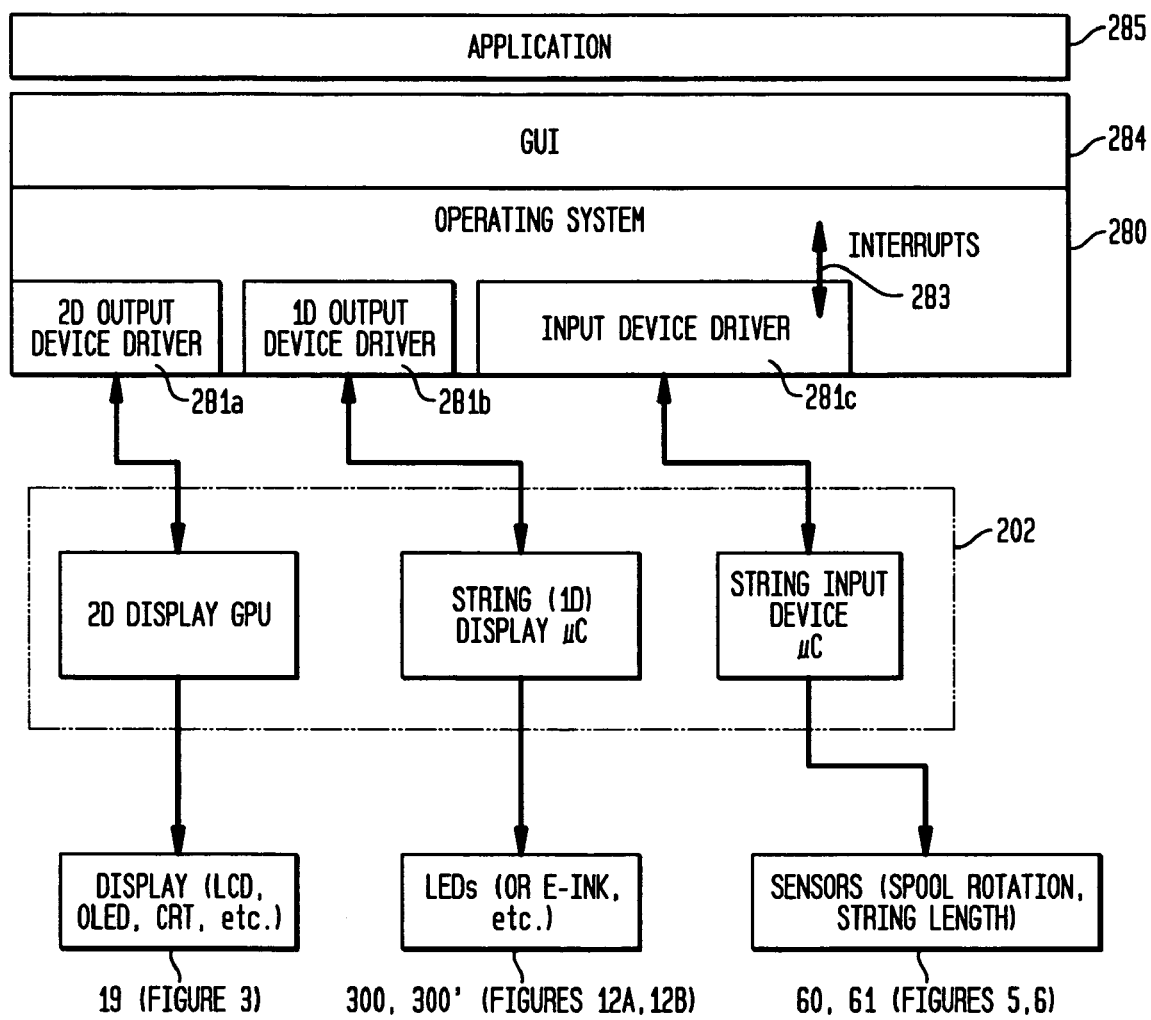
FIG. 10(b) is a general block diagram depicting a system O/S, GUI layer, Applications, and the underlying string interface hardware such that the events from the string ate passed on to the CPU as interrupts.

FIG. 10(b) is a general block diagram depicting the software architecture 275 of a small form factor and/or wearable device implementing the retractable cord interface of the present invention. For example, as shown in FIG. 10(b), at its lowest level, the small form factor and/or wearable device runs an operating system 280, e.g., LINUX v.3, that permits multiple user level and kernel level threads to run and will support multitasking and multi-user support. Device drivers 281a, . . . , 281c are provided for each input/output subsystem to handle low level device dependent code and interfaces so that higher level Application Programming Interfaces (APIs) can be implemented on top of them. The device drivers provided for each input/output subsystem include a two-dimensional (2D) output display device driver 281a, a one-dimensional (1D) output display device driver 281b, and, an input device driver 281c. Underlying the input device driver 281c are the string hardware interfaces such that the I/O events from the string are passed on to the CPU as interrupts 283 and are handled by the O/S 280 and then the graphical user interface layer 284 to be sent to the right application 285. Thus, for example, in response to extending the retractable string or cord 20 in connection with receipt of other string interface display mode and/or other user input command, suitable light signal drivers 281a,b integral with or connected as part of the CPU 202 are adapted for generating a light display, comprising a pattern or color(s), according to programmed instructions under command of the device CPU. It should be understood that the connection between the input device display and the input device's microcontroller (CPU) 202 may be a direct line; however, an intermediate physical/electrical wired or wireless protocol USB, Bluetooth, or a standard Inter IC (I2C) bus may be implemented.

In addition to the small form factor and/or wearable devices in which the retractable string-based interface of the present invention may be implemented, the retractable cord for enabling graphical and user interactivity can be implemented within a housing for use with other electronic wired or wireless devices, including, but not limited to: mobile computers, personal digital assistants (PDAs); Internet appliances; MP3 players; and personal audio player, e.g., Walkman® products. The retractable cord unit, or internal retractable cord, can be configured and operate the same as those embodiments described above. In such small form factor/wearable/and/or other electronic wired or wireless devices, the present invention may be used for controlling or otherwise interacting with a variety of applications and uses including, but not limited to, the following:

Scheduling: the retractable string interface display of the present invention (FIGS. 10, 12(a)-12(b), 13) used to indicate to a user device generated information may additionally be used as an interface for controlling/displaying scheduling applications, e.g., provided in a smart watch or PDA device. Thus, for example, in response to pulling the retractable string, the string interface display may generate signals enabling the user to navigate through a set of days, i.e., the user may flip/pan through a set of screens representing the days of the week using the button provided at the end of the string to select a day, and display more detailed information. Further, for example, pulling the string vertically allows the user to flip/pan through a list of scheduled events. In conjunction with this example application, for the embodiment of the string interface display (FIGS. 12(a)-12(b)), the string interface display may receive further signals to provide a display, e.g., via LED(s) color(s), or on/off state(s), to indicate (at a glance) the importance of a particular scheduled event(s), vacant or non-vacant time slots, etc. In a further example, the retractable string interface device itself may be used to scroll through letters of an alphabet, list of names, numbers, addresses, locations etc.

Messaging: the rectractable string interface display of the present invention (FIGS. 12(a)-12(b)) used to indicate to a user device generated information may additionally be used as an expedient way (i.e., at-a-glance) to obtain an indication of how many messages the small form factor device (or a centralized message repository to which the device is just a remote access client) may have received. Thus, for example, in response to pulling the retractable string interface, the string interface display may receive signals to provide a display indication representing the volume of messages, e.g., number of new e-mails received corresponding to the number of lit LEDs. Thus, in this example embodiment, the entire length of the rectractable string may represent a fixed number, e.g., 100; thus, when half of the LED's of the string interface display are lit, then the user knows that they have received 50 new messages. The lit LED's color may give a further indication of the state or urgency of the message (for example, a red LED that is lit may indicate receipt of an urgent message, or a flashing LED(s) may signify something of very high priority etc.). In another example, in response to pulling the string interface, for example, in another direction, the string interface display may receive signals to provide a display indicating the volume of either another group of messages (e.g., pulling the string in an East-West direction may indicate how many business/work related messages are waiting, while pulling the string in the North-South direction may show how many personal/home related messages are waiting), or, may show an indication for a preset filter (e.g., volume of personal messages from direct family vs. all personal acquaintances). Still by pulling the string interface, for example, in another direction, the string interface display may receive signals to provide a display indicating the number of personal and business related messages that need to be urgently answered within a period of time, e.g., the next hour.

Travel/Hobbies/Fitness: the rectractable string interface display of the present invention (FIGS. 12(a)-12(b)) may be used to indicate to a user device generated information may additionally be used as an expedient way (i.e., at-a-glance) to obtain an indication of how time or distance elapsed or remaining from a trip represented as a percentage of the total distance or allotted amount of time for completion. For example, if a wrist-worn watch is used in conjunction with a personal GPS receiver during a hiking trail. Thus, in this example, in response to pulling the string interface, the string interface display may receive signals to provide a display indicating the percentage of the trail that had been traveled, e.g., by a percentage of LEDs that are lit. In a further example, in response to pulling the string interface, the string interface display may receive signals to provide a display indication of the height (vertical) distance completed, e.g., when climbing a mountain, or wall climbing.

Still yet another potential application is the adaptation of the small form factor device for wirelessly or wired interfacing with a sensor device 299 such as shown in FIG. 10. In such an embodiment, the string interface display may receive signals to provide an indication of, for example, the following: the percentage of calories consumed during the day compared with a given dietary regimen; a user's blood Glucose level from a blood monitor/sensor device; a strength of any UV radiation a user may have received; an amount of time spent in the sun compared with a healthy amount of sun tanning; or, an amount of dangerous radiation exposure for user's proximate nuclear materials/ equipment or other forms of radiation as detected by a radiation sensor; an indication of remaining battery power in the portable device; and, an indication of the current reception strength in a wireless networking environment.

In a further example, the rectractable string interface itself may be equipped with a photosensor device, e.g., located at the grip end of the retractable string, that is adapted for measuring ambient light levels. Thus, in this example embodiment, a photographer user may pull the retractable string to activate the photosensor for measuring the ambient light levels, and further generate signals for receipt by the string interface display to provide a display indicating to the user whether there is sufficient light for taking a picture. Similarly, a scuba diver may pull the retractable string to activate a means for retrieving depth indication, or indication of the amount of oxygen left in that user's scuba tank. Thus, it is readily seen that in from these example underwater scenarios or, in example scenarios where gloves are worn (as in cold temperature locations) it much easier to grab a knob and pull the retractable string, than it is to press small buttons or touch a screen.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A method of displaying information from an electronic device comprising the steps of:

providing a spool device having a retractable cord means adapted for manipulation by a user, said cord means including a plurality of individual light emitting structures arranged in a linear dimension to provide a pixel display output on said retractable cord means;

providing a plurality of sensor devices provided at an aperture in said electronic device through which said retractable cord means is manipulated for extension or retraction, each said plurality of sensor devices adapted for generating input signals corresponding to movement of the cord means relative to said device;

manipulating said retractable cord means for generating signals from said plurality of sensors; and processing said signals for interacting with an executable application in said device, said interacting comprising one or more of: controlling navigation of a user interface associated with the executable application via a display means associated with said device; controlling movement of a cursor generated for display via said display means; and, performing, Input/Output (I/O) operations for said executable application via said display means associated with the device according to manipulation of said cord means, said signals processing comprising one or more steps of: determining a length of said cord means subject to said extension or retraction movement, determining an angular direction of cord means that is manipulated relative to said device, or determining an acceleration or deceleration of the cord means during both said extension and retraction of said cord means; and, indicating, via said pixel display output provided on said retractable cord means, electronic device generated information output from an executable application.

* * * * *

UNITED STATES PATENT AND TRADEMARK OFFICE
CERTIFICATE OF CORRECTION

PATENT NO. : 7,499,002 B2  Page 1 of 1
APPLICATION NO. : 11/053451
DATED : March 3, 2009
INVENTOR(S) : Gabor Blasko et al.

It is certified that error appears in the above-identified patent and that said Letters Patent is hereby corrected as shown below:

Title Page:

(75) Inventors: Chandrasekhar Naravanaswami, Wilton, CT (US)

should read

Title Page:

(75) Inventors: Narayanaswami Chandrasekhar, Wilton, CT (US)

Signed and Sealed this

Second Day of June, 2009

JOHN DOLL
*Acting Director of the United States Patent and Trademark Office*